United States Patent
Sprangle et al.

(10) Patent No.: US 7,296,140 B2
(45) Date of Patent: Nov. 13, 2007

(54) PREFETCHING DATA IN A COMPUTER SYSTEM

(75) Inventors: Eric A. Sprangle, Portland, OR (US); Anwar Q. Rohillah, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 115 days.

(21) Appl. No.: 11/331,658

(22) Filed: Jan. 12, 2006

(65) Prior Publication Data

US 2006/0117145 A1    Jun. 1, 2006

Related U.S. Application Data

(62) Division of application No. 10/244,250, filed on Sep. 16, 2002, now Pat. No. 7,032,076.

(51) Int. Cl.
*G06F 12/00*    (2006.01)
(52) U.S. Cl. .................. 711/213; 711/204; 712/207
(58) Field of Classification Search .............. 711/213
See application file for complete search history.

(56) References Cited

U.S. PATENT DOCUMENTS 6,604,190 B1 *   8/2003   Tran ........................... 712/207

OTHER PUBLICATIONS

Zhuang and Lee, in "A Hardware-based Cache Pollution Filtering Mechanism for Aggressive Prefetches", © 2003 IEEE . retrieved from http://ieeexplore.ieee.org/iel5/8782/27813/01240591.pdf?tp=&arnumber=1240591&isnumber=27813 on Jun. 19, 2007.*

* cited by examiner

*Primary Examiner*—Donald Sparks
*Assistant Examiner*—Jesse Diller
(74) *Attorney, Agent, or Firm*—David P. McAbee

(57) ABSTRACT

A method and apparatus to detect and filter out redundant cache line addresses in a prefetch input queue, and to adjust the detector window size dynamically according to the number of detector entries in the queue for the cache-to-memory controller bus. Detectors correspond to cache line addresses that may represent cache misses in various levels of cache memory.

24 Claims, 8 Drawing Sheets

PREFETCHING DATA IN A COMPUTER SYSTEM

CROSS REFERENCE TO RELATED APPLICATION

This application is a divisional of U.S. patent application Ser. No. 10/244,250 filed Sep. 16, 2002 now U.S. Pat. No. 7,032,076.

BACKGROUND OF THE INVENTION

1. Field of the Invention

The present invention is related to the field of computer systems, and more particularly, to prefetching data from memory locations.

2. Description of the Related Art

Prefetching is a technique commonly implemented in processors. Data and instructions required by a processor are prefetched before it is actually utilized by the processor's core execution unit (EU). As a result of prefetching, the prefetched data is available to the EU at the relatively higher data rates of the processor's internal bus. A hardware prefetch engine (HWP) in a processor normally prefetches the data required by the EU. Since the prefetched data and instructions (data) are available whenever the EU requires it, prefetching generally improves the processor's overall performance.

However, if prefetching is implemented incorrectly, prefetching may impair a processor or system's performance. In order to prefetch data and/or instructions, e.g., from external memory, the external memory bus is used. Hence, prefetching may occupy the resources of the external memory bus, thus reducing the effective bandwidth of the external memory bus. The data/instructions that are prefetched may be stored in cache memory that is close to the processor(s). For added efficiency, multiple levels of cache memory may be used. However, due to the limited size of the cache memory, prefetching of new data/instructions may overwrite previously-fetched data/instructions that are still needed.

In a typical processor, an entire cache line may be prefetched. For example, if a cache line consists of 32 bytes, and if a miss occurs in the cache, then 32 bytes at a time may be prefetched from external memory and stored in the cache. If multiple misses occur in the same cache line, the HWP may prefetch the same entire cache line multiple times. This method of prefetching is redundant and inefficient.

BRIEF SUMMARY OF THE DRAWINGS

Various embodiments of the invention may be understood by referring to the following description and accompanying drawings that are used for illustration. In the drawings.

DETAILED DESCRIPTION

Described is a method and apparatus to process instructions in a processor using a filter circuit. In addition, the method and apparatus may dynamically adjust a detector window depending on the number of entries for the bus. In the following description, numerous specific details such as logic implementations, opcodes, means to specify operands, types and interrelationships of system components, and logic partitioning or integration choices are set forth in order to provide a thorough understanding of the present invention. It will be apparent, however, to one of ordinary skill in the art that the present invention may be practiced without these specific details. In other instances, well-known architectures, control structures, gate level circuits, full software instruction sequences and techniques, etc., have not been shown to avoid unnecessarily obscuring an understanding of the description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected", along with derivatives such as "communicatively coupled" may be used. It should be understood that these terms are not intended as synonyms for each other. Rather, in particular embodiments, "connected" may be used to indicate that two or more elements are in direct physical or electrical contact with each other. However, "coupled" may also mean that two or more elements are not in direct contact with each other, but yet still co-operate or interact with each other.

Parts of the description are presented using terminology commonly employed by those skilled in the art to convey the substance of their work to others skilled in the art. Also, parts of the description are presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Figure 1:
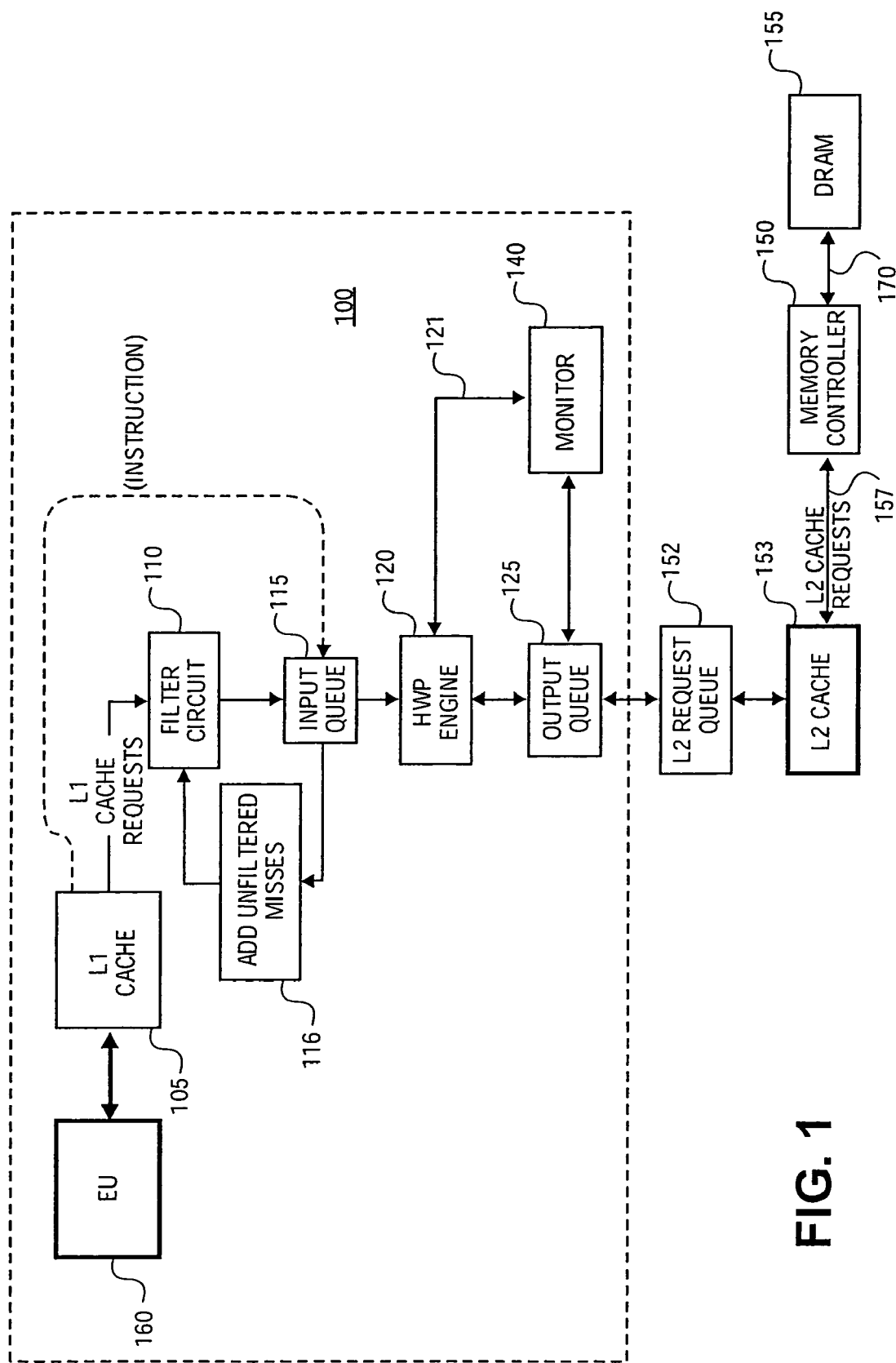
FIG. 1 shows a block diagram of a portion of a computer system, according to one embodiment of the invention.

FIG. 1 is a block diagram of a portion of a computer system, according to one embodiment of the invention. In the embodiment illustrated in FIG. 1, processor 100 includes execution unit (EU) 160 coupled to L1 cache 105, which is coupled to filter circuit 110. Cache line requests resulting from cache misses from L1 cache 105 may be input into filter circuit 110. A cache line request is a request for a block of data and/or instructions from main memory or from another level of cache memory. In one embodiment L1 cache 105 is an internal memory, (i.e., memory inside processor 100), but other embodiments may use other configurations (e.g., memory external to processor 100). Input queue 115 and output queue 125 may include control circuitry and buffer memory to process requests including cache misses from EU 160.

In one embodiment of the invention, the requests that enter input queue 115 through filter circuit 110 are read requests. These requests may be requests for data, instructions, or both (data/instructions) to be utilized by EU 160. The read requests may identify a memory address from which data is to be read. The addresses may be subject to address translation so that when received by the input queue 115, they may represent physical addresses or virtual addresses. Filter circuit 110 is coupled to input queue 115, and input queue 115 is coupled to HWP 120. Filter circuit 110 may filter out redundant cache line requests from the input filter queue 115. In one embodiment a cache line request comprises a request for a cache line containing data/instructions from an address location corresponding to an L1 cache miss. Thus, each entry in the input queue 115 may contain an address for retrieval of a single cache line.

In the embodiment of FIG. 1, the HWP 120 is coupled to output queue 125, and output queue 125 is coupled to L2 request queue 152. L2 request queue 152 is coupled to L2 cache 153, and L2 cache 153 is coupled to memory controller 150 via front side bus (FSB) 157. Although the term FSB is sometimes used in this disclosure to describe the cache-to-memory controller bus, it will be obvious to one of ordinary skill in the art that other terminology may be used for a bus that transfers data between cache and main memory, without deviating from various embodiments of the invention.

Monitor 140 may monitor the cache line requests (e.g., in the output queue 125) and assign detectors to cache line requests. In one embodiment of the invention, monitor 140 may be coupled to the HWP 120 or may form part of the HWP 120. In other embodiments of the invention, the monitor 140 may be coupled to the output queue 125 as a separate entity, or may form an integral part of the output queue 125. Memory controller 150 receives the cache line requests from the L2 cache 153 and retrieves data/instructions from memory, e.g. DRAM 155, via memory bus 170. Each queue described herein, e.g., the input queue 115, the output queue 125, and the L2 request queue 152 may have control and buffer circuitry to manage and to store the cache line requests, the prefetched data and other variables and counters.

In obtaining the data/instructions for the EU 160, the EU may send a request to the L1 cache. If the requested data/instruction is not found in the L1 cache, a cache miss is triggered (e.g., a flag may be set and a cache line request for the needed data/instruction may be sent to the L2 cache through the intervening logic). In one embodiment, once a first cache line request is received by the HWP 120, the HWP 120 or the monitor 140 may predict the next cache line that will be required by the EU 160 and send a request for that next cache line request to the L2 cache along with the first cache line request. If a cache line request is not found in the L2 cache 153, the cache line request may be forwarded to external memory (i.e., to DRAM 155) via FSB queue 157.

Since multiple cache line requests to the same instruction cache line are relatively rare, in one embodiment only cache line requests pertaining to cache data misses are input into filter circuit 110, while cache line requests pertaining to cache instruction misses are input directly into input queue 115 (see dashed-line arrow in FIG. 1). Since the HWP 120 prefetches in cache lines, or blocks, addresses that are within the same block of memory do not need to generate duplicate cache line requests. For example, if a cache line consists of 32 bytes and if a cache miss occurs for address location 9, then a request for a cache line that includes address location 9 is input into the input queue 115. However, if later a cache miss occurs for address location 10 (assuming that address location 10 is in the same cache line as address location 9), then a second request for the same cache line is not placed in input queue 115. Filter circuit 110, therefore, may filter out cache line requests for cache lines that have already been sent to input queue 115. The filtering of redundant cache line requests by the filter circuit 110 may permit the HWP 120 to run at a lower frequency (thereby consuming less power, and being simpler to design) as compared with sending a cache line request to the input queue 115 for each L1 cache miss.

Figure 2:
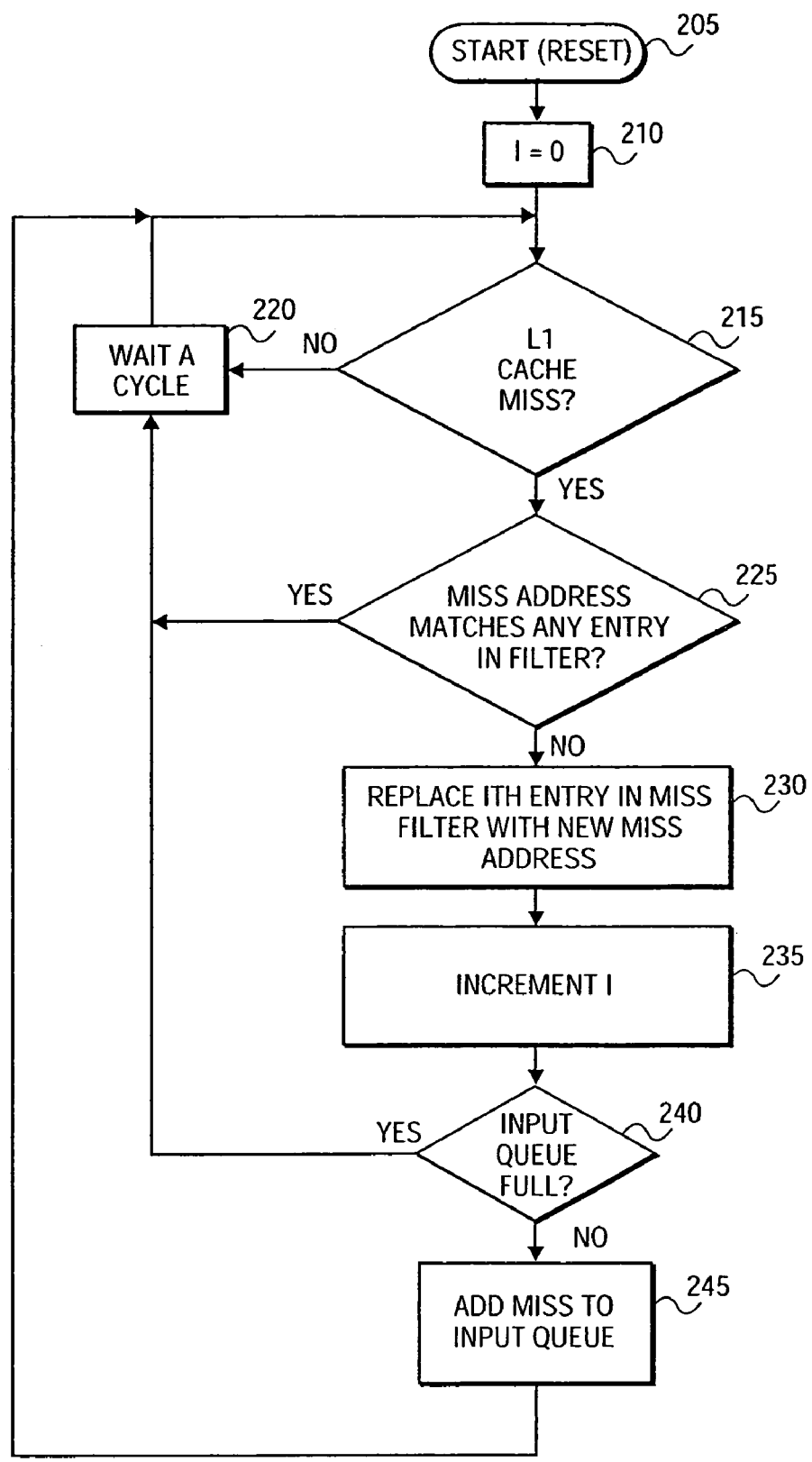
FIG. 2 shows a flow diagram that illustrates the operation of a filter circuit, according to one embodiment of the invention.
Figure 6:
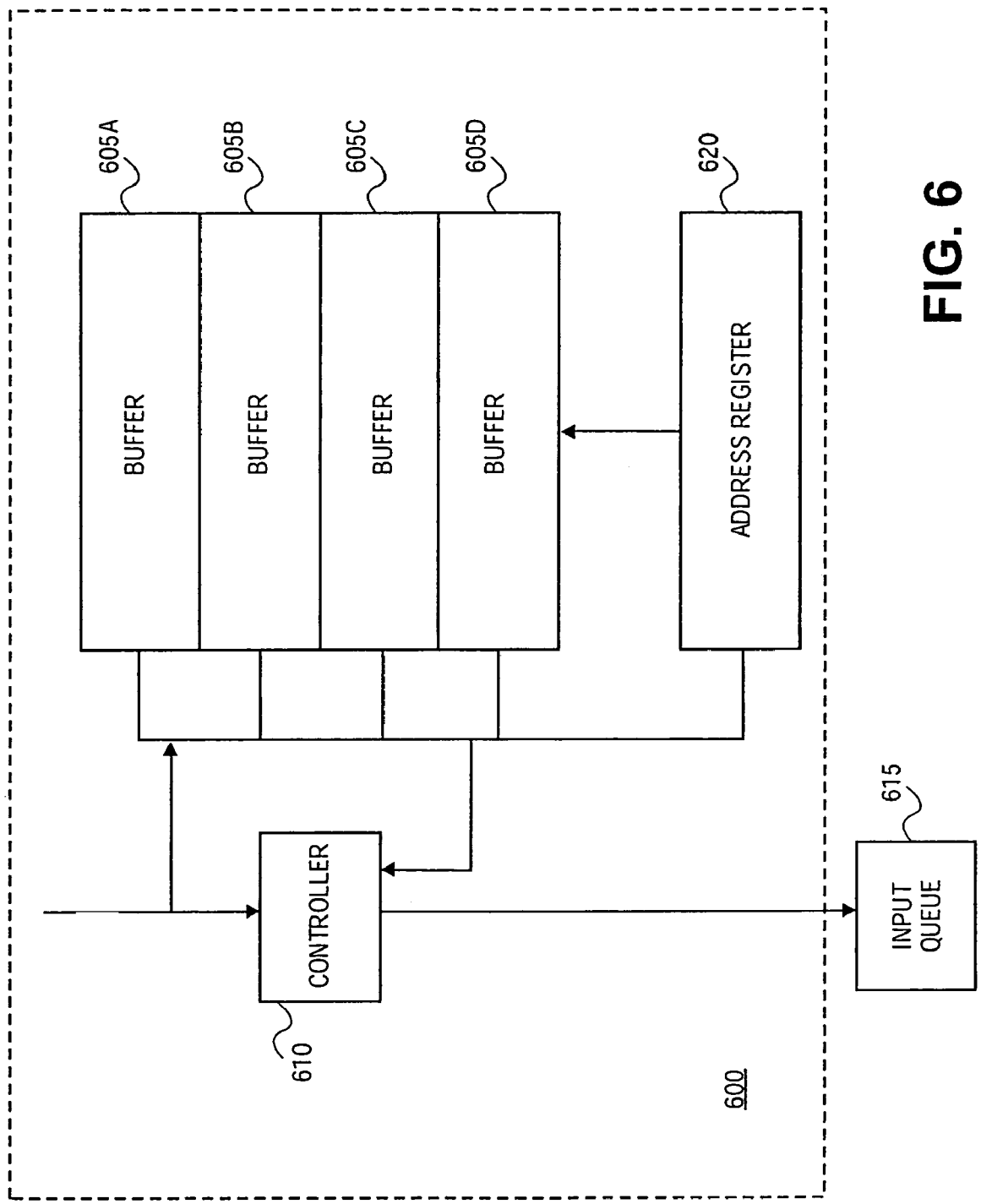
FIG. 6 shows a filter circuit, according to one embodiment of the invention.

The operation of the filter circuit 110, according to one embodiment of the invention, is described with respect to FIGS. 2 and 6. As illustrated in FIGS. 2 and 6, at 205 the filter buffers 605A-D and address register 620 are reset or cleared. At 210, a counter I (not shown) is initialized to zero. Counter I may be located in various circuits, for example in filter circuit 600 or in controller 610. In one embodiment of the invention, counter I points to the buffer location wherein cache line requests are stored next. At 215, a determination is made whether the data/instruction needed by the EU results in a cache miss. If the data/instruction is not available in the L1 cache, a cache miss is triggered.

Triggering a cache miss causes the address of a cache line corresponding to the request that triggered the cache miss (i.e., a cache line request), to be stored in address register 620. If no entries are stored in buffers 605A-D, the cache line request is stored at the buffer location pointed to by counter I. At 225, a determination is made, e.g., by controller 610 whether the address of the cache line matches the cache line address of any entries stored in buffers 605A-D. Although the embodiment of FIG. 6 compares cache line addresses, other embodiments may store in buffers 605A-D and compare other size increments (e.g., byte addresses, word addresses, etc.) In one embodiment a comparator circuit, e.g., comprising a series of exclusive-or gates (not shown), compares the bits of the cache line requests stored in the address register 620 with the cache line requests stored in buffers 605A-D. If the cache line request in address register 620 matches an entry in buffers 605A-D, then in one embodiment of the invention, the cache line request in address register 620 is discarded (e.g., the address register may be reset to a null value). In one embodiment of the invention, instead of discarding the cache line requests in address register 620, one processor cycle is allowed to elapse, and the next cache line requests (corresponding to the next cache miss) is stored in address register 620 during the next processor cycle.

However, if the cache line requests stored in address register 620 does not match an entry in buffers 605A-D, the cache line request in the buffer pointed to by the counter I is replaced with the cache line requests stored in address register 620. At 235, in one embodiment of the invention, after writing the cache line request to the buffer, the counter I is incremented. At 240, a determination is made, e.g., by controller 610 whether counter I points to the last buffer location. If the counter I points to the last buffer location indicating that all buffer locations 605A-D are full, a wait cycle may be introduced during which the HWP services the cache line requests in buffers 605A-D, thereby freeing up a buffer location for the next non-redundant cache line address.

In one embodiment of the invention, as cache line requests are serviced, the cache line requests advance serially through the buffer locations in a first-in first-out (FIFO) manner. For example, as the cache line request in buffer location 605a is serviced (i.e., sent to the HWP to the output queue) the other cache line requests in buffer locations 605b-d move one space up to fill the vacancy created in buffer location 605a. Thus, the new non-redundant cache line request is copied to free buffer location 605d, and the oldest entry (in time) is sent to the HWP via the input queue. At 245, if a buffer is available, the cache line address is written to that buffer. After adding the cache line request to the buffer at 245, the cycle may begin again at 215. Although the embodiment of FIG. 6 illustrates 4 buffers labeled 605A-D, other embodiments may have a different number of buffers and/or with other labels. In the embodiment illustrated in FIG. 6 controller 610 performs the converting of cache miss addresses to cache line requests and may write the cache line requests to the address register 620 as well as to buffers 605A-D when the buffer positions become available.

Figure 3:
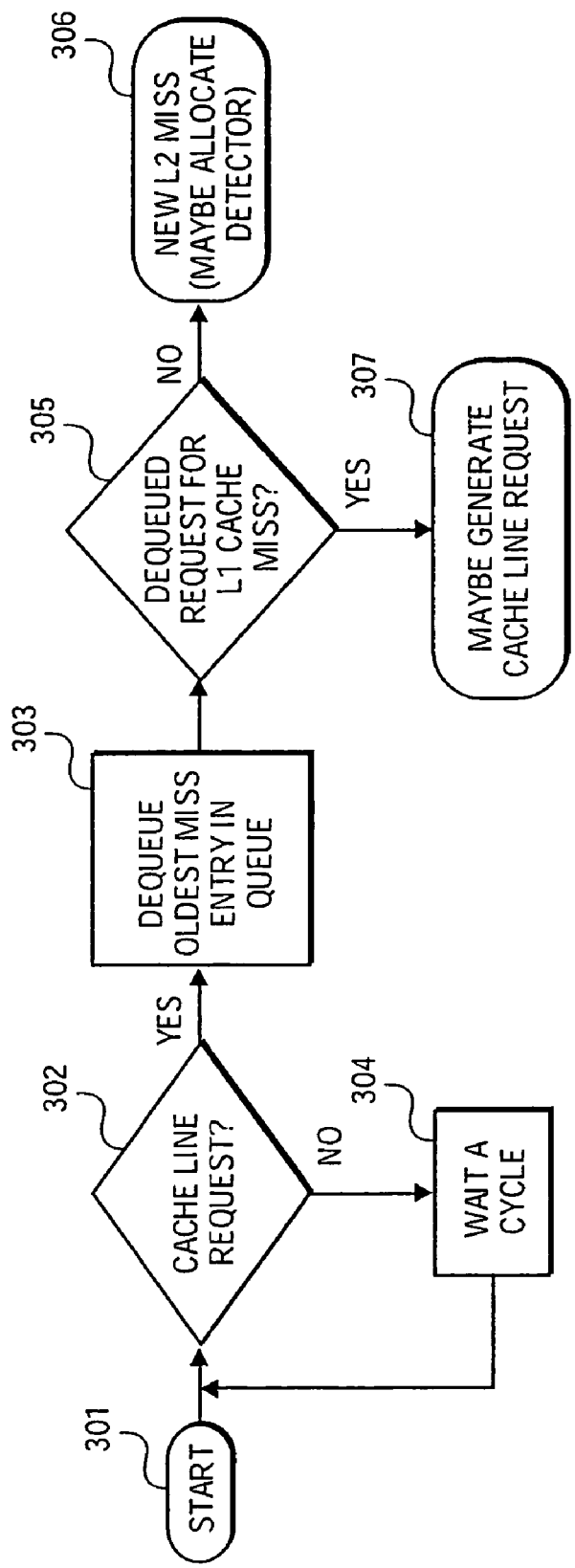
FIG. 3 shows a flow diagram that illustrates the servicing of queue entries in an input queue, according to one embodiment of the invention.

FIG. 3 is a flow diagram that illustrates the servicing of queue entries in the input queue. At 301, EU 160 sends a request for data/instruction to cache 105. At 302, a determination is made whether there is a cache line request (triggered by a cache miss). If there is no cache line request, then at 304 the input queue 115 triggers a wait cycle and no action is taken during this time. However, if at 302 there is a cache line request to the input queue 115, in one embodiment, at 303 the oldest cache line request (i.e., the cache line request that has been in the input queue 115 the longest) is dequeued to make room for the new request. Dequeuing a request means that a cache line request already in the queue is serviced by, e.g., the HWP 120. At 305, a determination is made, e.g. by the HWP 120, whether the dequeued cache line request in the input queue 115 is a request based on an L1 cache miss. In one embodiment of the invention, the HWP 120 determines the type of miss by checking a flag that corresponds with each cache line request to determine the type of miss. If, at 305, the cache line request is determined to be either an L1 data or instruction cache miss, then the address is compared with the detectors previously defined at 307. In one embodiment of the invention, a detector is defined as having an address equal to a previously created cache line prefetch request. However, if the cache line request at 305 is not an L1 cache miss, then at 306 it is determined that the cache miss is an L2 cache miss. If the cache miss is an L2 cache miss, the L2 cache line request (corresponding to the L2 cache miss) is allocated a detector as explained with regards to FIG. 5.

In one embodiment of the invention, the allocation of detectors may be found by match-detecting circuitry which may form part of the HWP 120. In alternate embodiments, the allocation of detectors may be performed by a separate circuitry, for example, by a monitor 140 that is coupled to output queue 125. In one embodiment of the invention, a detector is defined by parameters including an address, a direction, and a window size. The address of the cache line request in the input queue may be within the range of the detector address +/− the window size. The direction of the detector may be any one of the following values: zero, positive 1, or negative 1. Zero may means that the detector has not been assigned a direction. A positive 1 may indicate that the detector has a forward direction, and a negative one may indicate that the detector has a reverse direction. The address of the detector indicates the address of the next cache line prefetch request, and the direction of the detector is used to calculate the successive prefetch requests. For example, a detector with an address of 100 and with a direction of positive 1, implies that the next cache line prefetch request will be 100 followed by 101.

Figure 4A:
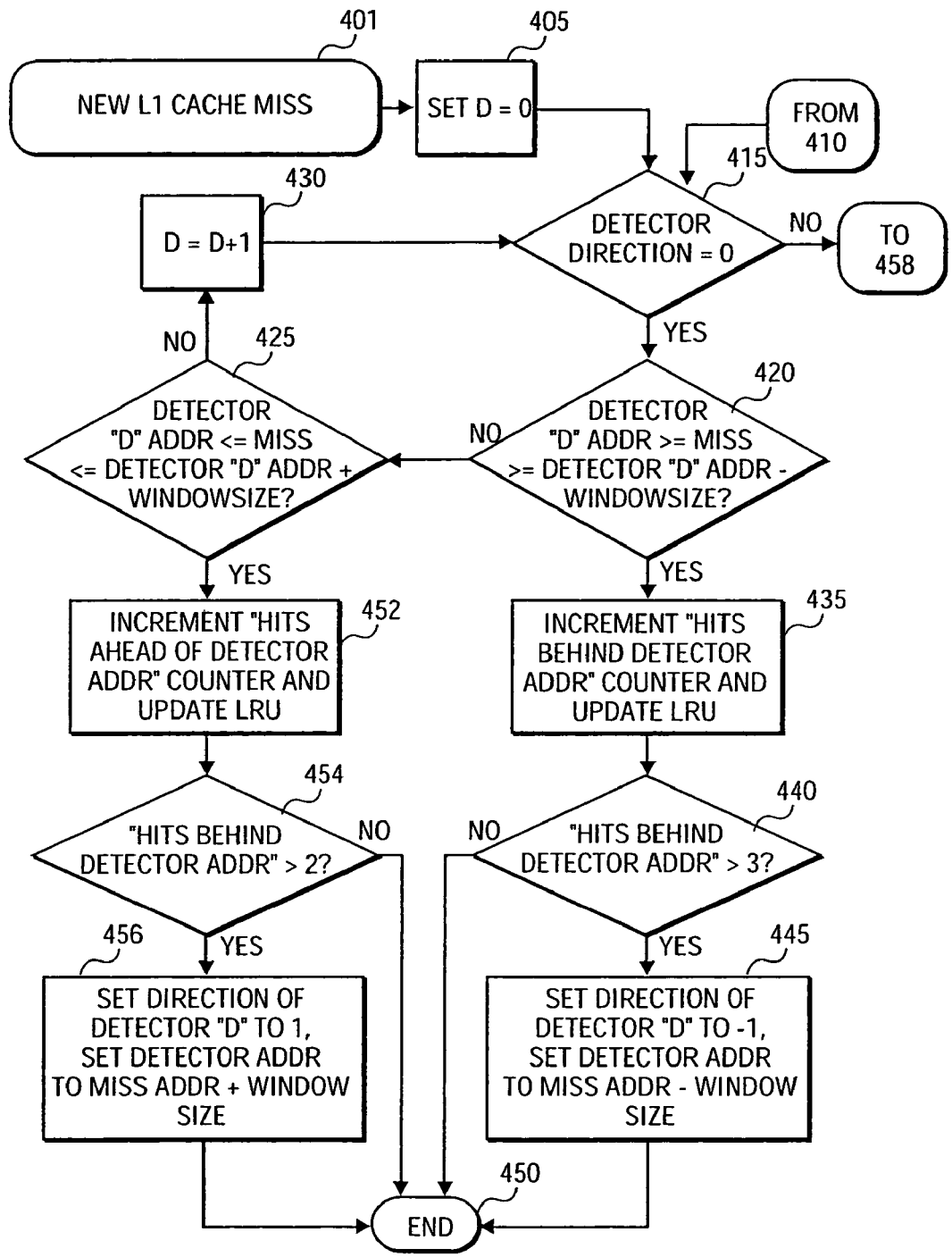
FIGS. 4A, 4B show a flow diagram that illustrates the assigning of detectors for cache misses and the dynamic adjusting of the window size, according to one embodiment of the invention.
Figure 4B:
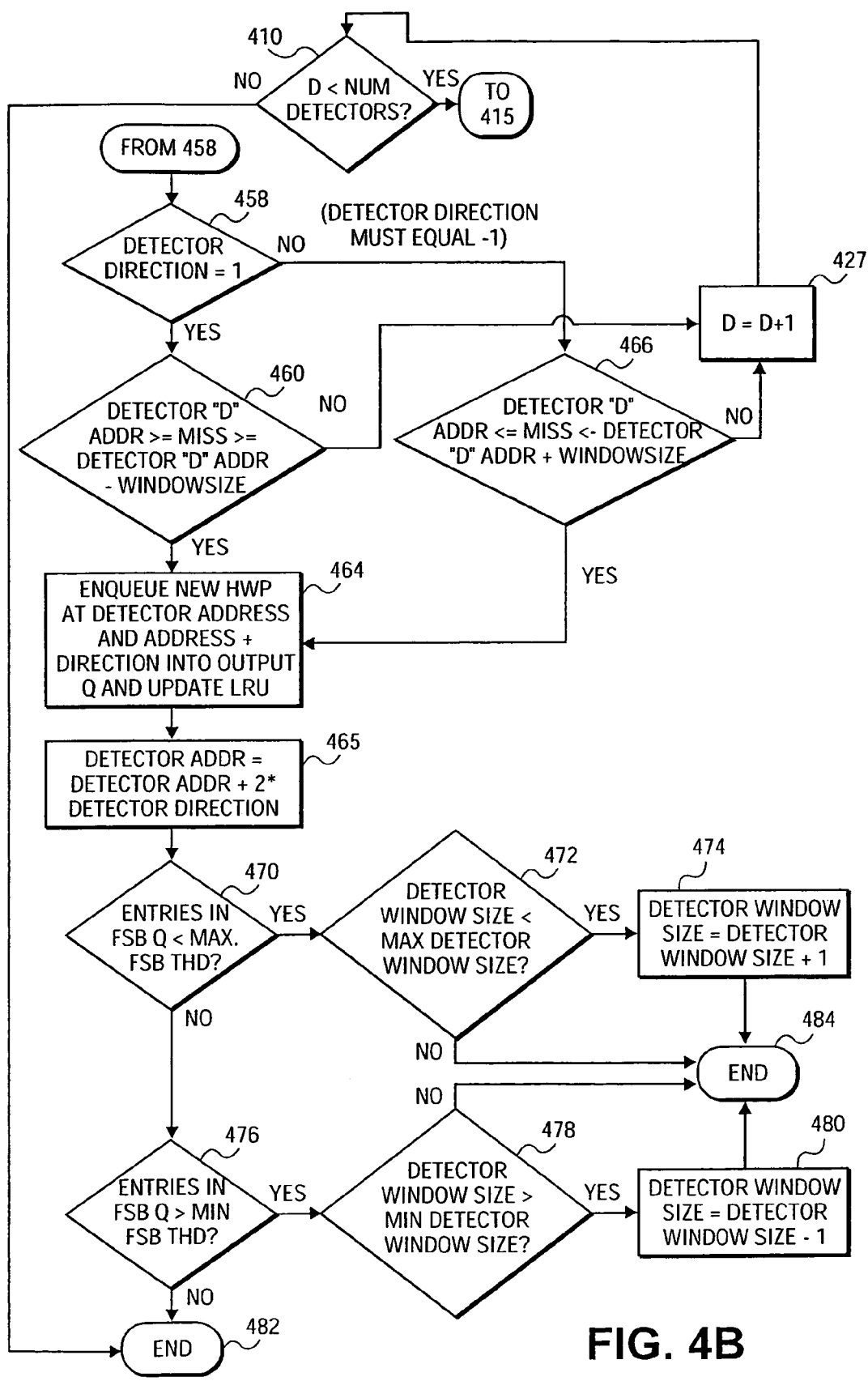
Figure 7:
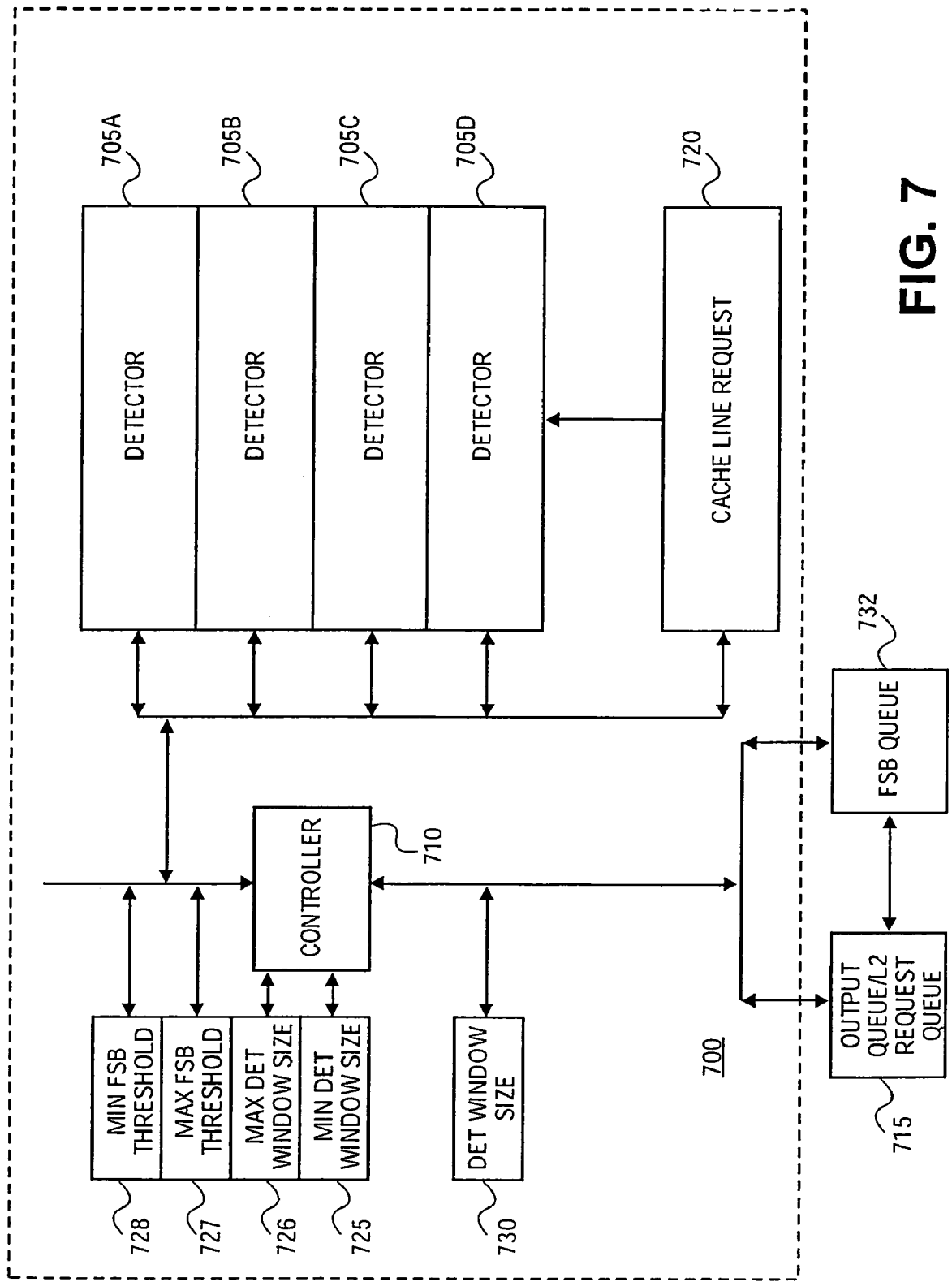
FIG. 7 shows a monitor to allocate detectors and to adjust the detector window size, according to one embodiment of the invention.

FIGS. 4A, 4B illustrate a flow diagram that shows the assigning of detectors for cache misses and the dynamic adjusting of the window size according to one embodiment of the invention. FIG. 7 illustrates a monitor according to one embodiment of the invention. In one embodiment of the invention, monitor 700 may be coupled to HWP 120 indicated by line 121 in FIG. 1. In alternate embodiments of the invention, monitor 700 may be a separate circuit that is coupled to output queue 125. The assigning of detectors is explained with reference to FIGS. 4A, 4B and 7. As FIG. 4A illustrates, at 401 an L1 cache line request is detected, for example, by controller 710 coupled the input queue 115. At 405, a variable "D" that represents a detector is initialized, for example to zero. At 415, a determination is made whether the direction of detector "D" is zero, (i.e., indicating that the direction of the detector has not yet been assigned). In one embodiment of the invention, the detectors are stored in buffers 705A-D.

Each detector has at least address bits, one or more bits indicating the direction from which data is prefetched relative to the detector address (direction flag), a hits ahead of detector (HAD) counter, a hits behind detector (HBD) counter, and a least recently used flag (LRU) tag. If the direction flag of the detector has a value of zero, then at 420 a determination is made, e.g., by controller 710 whether detector"D"address≧cachelineaddress≧detector"D" address−windowsize . . . [1] is true. In particular, controller 710 determines if the address of detector D is greater than or equal to the cache line address and whether the cache line address is greater than or equal to the address of detector D minus the window size. If yes to both, the HBD counter is incremented and the LRU tag is updated.

In one embodiment of the invention, the detector window size 730 is a global variable that determines the aggressiveness with which data is prefetched. A large window size indicates aggressive prefetching and vice versa. If equation [1] is true, then a counter called the HBD counter is incremented, and the LRU tag is set, e.g., with a value indicating the time. At 440, a determination is made, e.g., by controller 710 whether the HBD counter for the detector has a value that is greater than, e.g., three. If the HBD counter is greater than three, then at 445 the direction of detector "D" is set to negative 1. In addition, in one embodiment of the invention, at 445 the address of the detector is set to the cache line address (miss address) minus the window size. In one embodiment of the invention, if at 440, the HBD counter does not have a value greater than three, the process ends at 450. If at 420 equation [1] is false, then at 425 a determination is made, e.g. by controller 710, whether detector "D"address≦cachelineaddress≦detector"D"address+windowsize . . . [2] is true.

In particular, controller 710 determines if the address of detector D is less than or equal to the cache line address and whether the cache line address is less than or equal to the address of detector D plus the window size. If condition [2] is true, then the HAD counter is incremented and the LRU tag is updated at 452. After incrementing the HAD counter and the LRU tag for detector "D" at 452, a determination is made at 454 whether HAD counter is greater than two. If the HAD counter is greater than two, than at 456 the direction of detector "D" is set to plus one, and the address of the detector is set to the miss address plus the window size. After setting the address and direction of the detector at 456 the process ends at 450. If at 425 the result of condition [2] is false, then at 430 the counter "D" is incremented by one and the process is repeated.

However, if at 415 the direction of the detector is determined not to be equal to zero, at 458 a determination is made, e.g., by controller 710, whether the direction of detector "D" is equal to one. In particular, a detector having a direction of 1 means that the next cache line address that is prefetched has an address that is greater than the address of the assigned detector. Hence, the data that is prefetched is the data that corresponds with the detectors address, and in addition, the data that corresponds with the next cache line address. If at 458 the detector direction is equal to one, then at 460 a determination is made, e.g., by controller 710, whether detector"D"address≦cachelineaddress≦detector "D"address−windowsize . . . [3] is true. In particular, controller 710 determines if the address of detector D is greater than or equal to the cache line address and whether the cache line address is greater than or equal to the address of detector D minus the window size.

In one embodiment of the invention, once a detector is assigned a cache line address then data corresponding to cache lines ahead and behind the assigned detector are automatically prefetched. If the condition [3] is false, then the variable "D" is incremented by one, at 427, and process flows to 410. At 410 a determination is made, e.g., by controller 710 whether all the detectors have been assigned cache line addresses. However, if condition [3] is true, then at 464 controller 710 enqueues the detector D and obtains data corresponding to detector D as well as data corresponding to the adjacent cache line that has an address to the right of the address of detector D (i.e., corresponding to the next highest cache line request address). Next, at 465 the detector address is set equal to the detector address plus two times the detector direction. The direction of detector D is incremented by 2 so that subsequent prefetches obtain data corresponding to the next two cache line requests.

If at 458 the direction of detector D is not equal to 1, then at 466 a determination is made whether detector "D"address≦cachelineaddress≦detector"D"address+windowsize . . . [4]. In particular, controller 710 determines if the address of detector D is less than or equal to the cache line address and whether the cache line address is less than or equal to the address of detector D plus the window size. If condition [4] is true, the process flows to 464. However, if condition [4] is falls the process flows to 427.

In one embodiment of the invention, the monitor adjusts the window size in accordance with the number of cache line requests in the FSB queue 732. The algorithm ensures that if the window size is too big, then more detectors are likely to trigger as compared with the window size being too small. Triggering a detector means that the detector is assigned a cache line address and is sent to the output queue 125 or the L2 request queue to fetch the corresponding data. If the FSB queue 732 is under-utilized, the window size is increased, and if the FSB queue 732 has too many entries (over-utilized), then the window size is reduced. When the window size is reduced fewer detectors are triggered.

At 470, a determination is made, e.g., by controller 710 whether the number of entries in the FSB queue 732 is less than a maximum FSB threshold value 727. In one embodiment of the invention, the maximum FSB threshold value 727, the minimum FSB threshold value 728, the maximum detector window size 726, and the minimum detector window size 725, and the detector window size 730 are variables stored in the monitor 700. If the number of entries in the FSB queue 732 is less than the maximum FSB threshold value 727, then at 472 a determination is made, e.g. by controller 710 whether the detector window size 730 is less than the maximum detector window size 726. If at 472, the detector window size 730 is less than the maximum detector window size 726, than at 474 the detector window size 730 is incremented by one and the process ends at 484.

However, if the number of entries in the FSB queue 732 is not less than the maximum FSB threshold value 727, then at 476 a determination is made, e.g., by controller 710 whether the number of entries in the FSB queue 732 is greater than a minimum threshold value 728. If the number of entries in the FSB queue 732 are greater than the minimum threshold value 728, at 478 a determination is made, e.g., by controller 710 whether the detector window size 730 is greater than the minimum detector window size 725. If at 478, the detector window size 730 is greater than the minimum detector window size 725, then at 480 the detector window size variable 730 is set equal to the detector window minus one. However, if at 478 the detector window size 430 is less than the minimum detector window size 725, the process ends at 484.

Thus, the window size is adjusted in accordance with the number of entries in the FSB queue. If the FSB queue 732 has few entries, the detector window size 730 is increased. If the FSB queue 732 has too many entries, the window size 730 is reduced.

Figure 5:
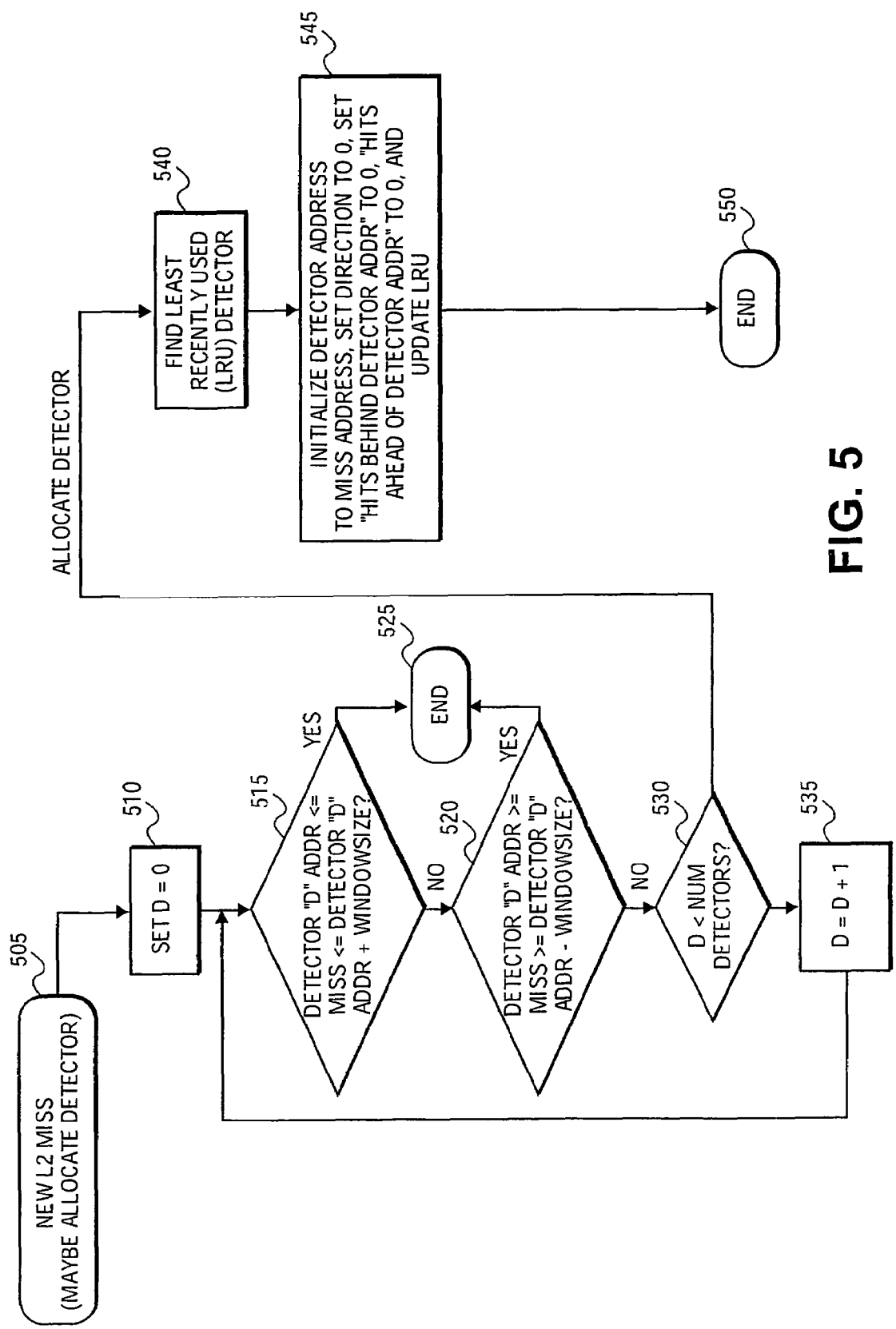
FIG. 5 shows a flow diagram that illustrates allocating detectors for L2 cache misses, according to one embodiment of the invention.

FIG. 5 illustrates a flow diagram for allocating detectors for L2 cache misses according to one embodiment of the invention. As FIG. 5 illustrates, at 505 the input queue 115 detects a new L2 cache line. At 510, a variable "D" indicating the detector number is initialized by, e.g., controller 710 to zero. At 515, a determination is made, e.g., by controller 710 to determine whether detector "D"address≦cachelineaddress≦detector"D"address+windowsize . . . [5] is true. In particular, controller 710 determines if the address of detector D is less than or equal to the cache line address and whether the cache line address is less than or equal to the address of detector D plus the window size. If condition [5] is true the process ends at 525. If [5] is false, then at 520 a determination is made, e.g., by controller 710 whether detector"D"address≧cachelineaddress≧detector"D"address−windowsize . . . [6] is true. In particular, controller 710 determines if the address of detector D is greater than or equal to the cache line address and whether the cache line address is greater than or equal to the address of detector D minus the window size. If condition [6] is true the process ends at 525. However, if condition [6] is false a determination is made, e.g., by controller 710 whether "D" is less than the maximum number of detectors. If D is less than the maximum numbers of detectors assigned by monitor 700, the LRU detector is identified by 540 e.g., by controller 710 comparing the time stamps of the detectors. Once the LRU detector is identified, at 545 the least recently used detector is initialized. In one embodiment, initializing the least recently used detector means setting the detector address to the miss address, and setting the direction of the detector to zero. Also, setting the HBD counter to zero, and the HAD counter to zero, and updating the LRU detector counter. After the LRU detector is initialized, the process ends at 550.

As previously described, the aggressiveness of the filtering operation may be adjusted by adjusting the parameters for maximum and minimum detector window size, and for maximum and minimum number of entries in the FSB queue. These parameters, and the associated aggressiveness, may be tuned for various operating modes. For example, a more aggressive set of parameters may be used if the processor is in single threaded (ST) mode, while a less aggressive set of parameters may be used if the processor is in simultaneous multithreading mode (SMT). The parameters may be adjusted for other operating modes and/or operational conditions as well, and may even be adjusted to accommodate a combination of operational conditions rather than a single operational condition. Various ways of programming the parameters may be used. In one embodiment, one or more bit(s) are set to indicate the operational condition, and hardware translates the state of these bits into the associated parameters. In another embodiment, the parameters are programmed directly into registers, from where the parameters are accessible to the relevant circuitry. Other techniques of programming the relevant parameters may also be used.

Thus, a method and apparatus have been disclosed to filter cache line addresses in the input queue and to adjust the detector window size dynamically according to the number of entries in the FSB. While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method comprising:
generating a plurality of detectors, each corresponding with a prefetch address and a detector window size variable;
sending at least one of the plurality of detectors to a cache-to-memory controller bus queue to prefetch at least one of data and instructions;
monitoring a number of the at least one of the plurality of detectors in the cache-to-memory controller bus queue; and
adjusting the detector window size variable depending upon the number of the at least one of the plurality of detectors in the cache-to-memory controller bus queue.

2. The method of claim 1 wherein the prefetch address comprises at least one of an address of a data miss in cache and an address of an instruction miss in cache.

3. The method of claim 1 wherein the prefetch address is a cache line address.

4. The method of claim 1 wherein the detector window size is dynamically increased if there are less than a predetermined first number of detectors in the cache-to-memory controller bus queue and the detector window size is dynamically decreased if there are more than a predetermined second number of detectors in the cache-to-memory controller bus queue.

5. The method of claim 4 wherein the detector window size is dynamically increased if the detector window size is less than a maximum detector window size variable.

6. The method of claim 4 wherein the detector window size is dynamically decreased if the detector window size is greater than a minimum detector window size variable.

7. An apparatus comprising:
a plurality of detector buffers to store a plurality of detectors;
a cache line request buffer coupled to the plurality of detector buffers; and
a controller coupled to the plurality of detector buffers and the cache line request buffer, said controller to allocate detectors to cache line requests, and to dynamically adjust the number of detectors sent to a cache-to-memory controller bus queue.

8. The apparatus of claim 7 wherein the cache line requests comprise at least one of addresses of data misses in cache and addresses of instruction misses in cache.

9. The apparatus of claim 7 wherein the controller is to monitor the cache-to-memory controller bus queue and increase the number of detectors sent to the cache-to-memory controller bus if the number of detectors in the cache-to-memory controller bus queue are less than a predetermined first quantity, and to decrease the number of detectors sent to the cache-to-memory controller bus queue if the number of detectors in the cache-to-memory controller bus queue are more than a predetermined second quantity.

10. The apparatus of claim 7 wherein the controller is to monitor a detector window size variable that is dynamically adjusted corresponding to the number of entries in the cache-to-memory controller bus queue.

11. The apparatus of claim 7, wherein the controller is coupled to an output queue.

12. The apparatus of claim 11, wherein the output queue is coupled to the cache-to-memory controller bus queue.

13. The apparatus of claim 7, wherein the controller is coupled to a hardware prefetch engine.

14. A computer system comprising:
an external bus;
an external memory coupled to the external bus;
a processor core coupled to a cache memory and to the external memory, said processor comprising
a plurality of detector buffers to store a plurality of detectors;
a cache line request buffer coupled to the plurality of detector buffers; and
a controller coupled to the plurality of detector buffers and the cache line request buffer, said controller to allocate detectors to cache line requests, and to dynamically adjust the number of detectors sent to a cache-to-memory controller bus queue.

15. The computer system of claim 14 wherein the cache line requests comprise at least one of addresses of data misses in cache and addresses of instruction misses in cache.

16. The computer system of claim 14 wherein the controller is to monitor the cache-to-memory controller bus queue and increase the number of detectors sent to the cache-to-memory controller bus queue if the number of detectors in the cache-to-memory controller bus queue are less than a predetermined first quantity, and to decrease the number of detectors sent to the cache-to-memory controller bus queue if the number of detectors in the cache-to-memory controller bus queue are more than a predetermined second quantity.

17. The computer system of claim 14 wherein the controller is to monitor a detector window size variable that is dynamically adjusted corresponding to the number of entries in the cache-to-memory controller bus queue.

18. The computer system of claim 14, wherein the controller is coupled to an output queue.

19. The computer system of claim 18, wherein the output queue is coupled to the cache-to-memory controller bus queue.

20. The computer system of claim 18, wherein the output queue is coupled to the external memory.

21. The computer system of claim 20, wherein the external memory is dynamic random access (DRAM) memory.

22. The computer system of claim 14, wherein the controller is coupled to a hardware prefetch engine.

23. The computer system of claim 14, wherein the dynamic adjustment of the number of detectors is based on an operating mode of the processor.

24. The computer system of claim 23, wherein the operating mode of the processor is one of a single threaded mode and a simultaneous multithreading mode.

* * * * *